W. R. ORMANDY & J. W. SPENSLEY.
PROCESS OF MANUFACTURING DETERGENTS.
APPLICATION FILED MAR. 9, 1912.
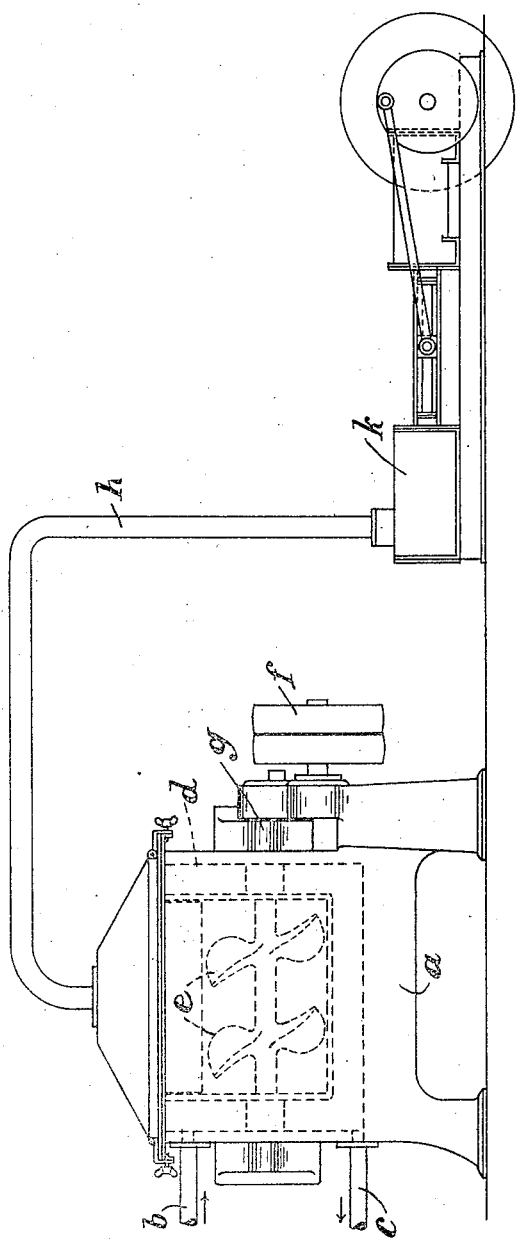
Witnesses
Inventors
William R. Ormandy
Jacob W. Spensley

UNITED STATES PATENT OFFICE.

WILLIAM REGINALD ORMANDY AND JACOB WILLIAM SPENSLEY, OF MANCHESTER, ENGLAND.

PROCESS OF MANUFACTURING DETERGENTS.

1,046,847.  Specification of Letters Patent.  Patented Dec. 10, 1912.

Application filed March 9, 1912. Serial No. 682,671.

*To all whom it may concern:*

Be it known that we, WILLIAM REGINALD ORMANDY and JACOB WILLIAM SPENSLEY, subjects of the King of Great Britain, both residing at Manchester, in the county of Lancaster, in the Kingdom of England, have invented a certain new and useful Process of Manufacturing Detergents, of which the following is a specification.

This invention relates to the manufacture of finely divided washing sodas which may consist either of carbonate of soda alone, or more usually of mixtures of carbonate with silicate of soda or other detergent substances of a similar character. It is desirable to produce such washing sodas in a finely divided form, and they are often sold in such a form in bags or packages for household use. It is found that these finely divided washing sodas tend to become caked together into a hard lump or mass which is very inconvenient to deal with. The result is the same whether the soda is prepared by precipitation from a solution which is rapidly cooled down, or whether it is prepared by crushing soda lumps or large crystals. Our investigations as to the cause of this caking of washing soda have shown that it is mainly due to the fact that the carbonate of soda as prepared is not a uniform body with the same amount of water of crystallization throughout, but that some of the carbonate is present in the form of the monohydrated carbonate $Na_2CO_3.H_2O$, and the remainder is mainly in the form of the decahydrated carbonate $Na_2CO_3.10H_2O$ which is the body which normally crystallizes out from a solution of carbonate below a temperature of about 30 degrees centigrade. There may be a certain amount of intermediate hydrated carbonates present but these are relatively unimportant. The monohydrated carbonate is hygroscopic or tends to absorb water from the atmosphere, while the decahydrated carbonate is efflorescent, that is to say it tends to give up its water of crystallization to the atmosphere or to other bodies. The result is that the decahydrated carbonate tends to decompose giving up its water to the monohydrated carbonate, and fresh crystals are formed or grown consisting of intermediate hydrated carbonates with say 6 or 7 molecules of water of crystallization, and these new crystals knit the mass together into a solid lump. Experiments have shown however that if a carbonate is taken having from 5 to 7 molecules of water of crystallization, and not having any admixture of carbonates with either lower or higher amounts of water of crystallization, the resulting body is neither efflorescent nor hygroscopic under usual atmospheric conditions, and it has practically no tendency to change its composition, so that it will remain for a long time in a finely divided state such as is required in washing sodas for household use. If silicate of soda or other detergent bodies which do not interact with the carbonate, be mixed with it the result is still the same. We have found that it is possible to get a washing soda in which the carbonate is practically all in the required condition, approximately consisting of the hexahydrated carbonate $Na_2CO_3.6H_2O$, or the heptahydrated carbonate $Na_2CO_3.7H_2O$, by causing the crystallization to take place under certain conditions and between certain temperatures.

If carbonate of soda be mixed with enough hot water to form say the heptahydrated carbonate, the monohydrated carbonate is immediately formed when the water and the salt are put together. Then as the solution is cooled there is a range of temperature, from about 34 degrees centigrade down to 30 degrees centigrade at which the heptahydrated carbonate tends to become crystallized out. If the liquid be kept within this range of temperature and if it be stirred or broken up to prevent the formation of large crystals, the whole of the crystallization can take place within this range of temperature, giving a practically uniformly hydrated carbonate. The resulting crystalline product is a stable body for practical purposes under atmospheric conditions. If other detergent substances such as silicate of soda be mixed with the carbonate the result is simply to change to a certain extent the range of temperature between which the desired body crystallizes out from the solution. For example, if a mixture be made of a certain amount of silicate of soda solution of 1.2 specific gravity, with an equal amount by weight of anhydrous carbonate of soda, (so that the mixture contains about 19 parts by weight of silicate of soda to 100 parts of carbonate and 100 parts of water,) the range of temperatures is depressed by about 2 degrees owing to the presence of the silicate, so that the carbonate with the desired amount of water of crystallization is formed at temperatures between about 32 and 28 degrees centigrade. The temperatures would be lower still if a larger amount of silicate of soda in relation to the carbonate, were present.

In the accompanying drawing an apparatus is indicated which may be used in carrying the invention into effect.

If the washing soda is to contain practically nothing but carbonate of soda then the method of working is fairly obvious from what has been stated above. The amount of hot water for making the solution is simply that amount which will give with the soda used a product which is approximately the heptahydrated carbonate. If anhydrous soda ash be taken as the carbonate, the whole amount of the water will be added as hot water, but if a partially hydrated carbonate is used, the amount of water in it will be determined by experiment and the remainder will be added to make up the desired amount. This mixture or solution is placed in a mixing chamber in an apparatus, such as that shown, wherein $a$ is the frame, $d$ a water jacket with inlet and outlet pipes $b$ and $c$, and $e$ are the mixer blades on shafts driven from a pulley $f$ through gearing $g$. The temperature is allowed to fall to about 34 degrees centigrade, and the fall of temperature may be hastened to this point by circulating cooling water through the jacket $d$. About this temperature the rate of cooling rapidly falls off and the temperature is allowed to remain constant or nearly constant for some time, the water circulation being stopped, or the temperature of the water kept at say 30° C. The liquid at once begins to thicken, and when it has come to a pasty condition it is desirable to slightly cool the liquid again by artificial means, in order to take out the heat of the solution and to permit the formation of dry crystals, otherwise the heat produced by the stirring may be sufficient to prevent the crystallization from being completed. The heat is most conveniently taken out at this stage by connecting the mixing chamber to a suction apparatus by which a fairly high vacuum is produced, and the consequent evaporation of some of the water in the solution causes an amount of heat to be given out which is sufficient to insure the rapid crystallization of the desired body above the critical temperature at which the decahydrated carbonate would form. In the drawing $k$ indicates a suction pump and $h$ a pipe connecting the pump to the lid or cover of the mixer $a$. After the whole mass has become crystallized it can be cooled as rapidly as desired and may be put up in packets and sold.

If the washing soda is to be a mixture of silicate and carbonate, a solution of silicate of soda is taken at say 40 Twaddell (specific gravity 1.2) and it may be assumed that in a liter of this solution there is 1 kilogram of water and 0.2 kilograms of silicate, because the silicate is a heavy body and its volume is comparatively small relatively to that of the water. Sufficient anhydrous carbonate of soda is added to the silicate solution as in the first instance to give a carbonate with 7 molecules of water of crystallization, assuming that the carbonate takes up the whole of the water. A little more water may be added, or, rather, a little less carbonate may be added to the silicate solution to allow for evaporation of some of the water in the cooling. The process of crystallizing out is then substantially the same as above described except that the temperature at which the heptahydrated carbonate begins to crystallize is about 2 degrees lower than before. If a stronger silicate solution were used the temperature of crystallization might be still further lowered. In order to give an indication of the time occupied in these various operations we may say that our experiments have shown that it takes about 1½ or 2 hours with a washing soda solution containing about 200 or 250 kilograms of soda, to effect the crystallization in a stirring apparatus to which a vacuum is applied at a temperature of about 32 degrees centigrade.

It has been assumed in what has been stated above that the heptahydrated carbonate is the desired body but it is to be clearly understood that the hexahydrated or the penta-hydrated carbonates are practically as good for the purpose in view, so that a good deal of variation may occur in the amount of water without deleteriously affecting the result. Hexa- and penta hydrated carbonates will usually be formed after a certain amount of heptahydrated carbonate has been formed at a temperature of say 32 degrees centigrade if there is not sufficient water left for the whole mass to crystallize as heptahydrated carbonate. The resulting body will be as good for practical purposes as if all the carbonate had 7 molecules of water of crystallization.

We declare that what we claim is:—

1. A process for producing washing soda in a finely divided form, consisting in making a mixture of washing soda with warm water, sufficient to combine with the carbonate of soda present to form a hydrated carbonate with not less than 5 and preferably not more than seven molecules of water of crystallization, cooling down the mixture to a temperature above but as close as practicable to that at which crystallization will begin to occur with the formation of the decahydrated carbonate, and maintaining the temperature approximately constant until the crystallization is substantially complete.

2. A process for producing washing soda in a finely divided form, consisting in making a mixture of detergent substance containing carbonate of soda with water sufficient in quantity to form the pentahydrated carbonate with the carbonate of soda present, and insufficient to form the decahydrated carbonate, then cooling down the solution to a temperature at which the heptahydrated carbonate tends to crystallize, (this temperature being higher than that at which the decahydrated carbonate tends to crystallize) and maintaining the mixture at that temperature until the crystallization has taken place.

3. A process for producing washing soda in a finely divided form, consisting in making a mixture of detergent substance containing carbonate of soda with sufficient water, at least five molecules, with a little extra to allow for evaporation, to form hydrated carbonate of a lower degree of hydration than the decahydrated carbonate, cooling the mixture with stirring to a temperature above but as close as practicable to the critical temperature at which the decahydrated carbonate tends to form, and maintaining the mixture above that critical temperature while stirring it until crystallization has taken place.

4. A process for producing washing soda in a finely divided form, consisting in making a mixture of detergent substance containing carbonate of soda with sufficient warm water to form a hydrated carbonate with not less than 5 and not more than seven molecules of water of crystallization, agitating the mixture with stirring and permitting cooling to take place down to a temperature above but as close as practicable to the critical temperature at which the decahydrated carbonate tends to form, while the mixture is subjected to a reduced pressure whereby vaporization of water is caused to take place from the mixture.

5. A process for producing washing soda in a finely divided form, consisting in making a mixture of detergent material containing sodium carbonate and water at a temperature such that a liquid mixture results, with sufficient water to form with the carbonate of soda in the mixture a hydrated carbonate having not less than 5 and preferably not more than seven molecules of water of crystallization, agitating the mixture and cooling it down to a temperature above but as close as practicable to the critical temperature at which the decahydrated carbonate tends to form, and vaporizing some of the water from the mixture by the action of a partial vacuum, whereby a finely divided crystallized substance is produced containing carbonate of soda with from 5 to 7 molecules of water of crystallization.

6. A process for producing washing soda in a finely divided form, consisting in making a detergent solution containing carbonate of soda with water at a temperature such that a fluid mixture is formed, the water being sufficient to make with the carbonate of soda a hydrated carbonate containing not less than 5 molecules of water of crystallization, cooling the mixture with agitation to a temperature at which the heptahydrated carbonate tends to crystallize, but above the critical temperature at which the decahydrated carbonate will form, and continuing the agitation above the said critical temperature until the crystallization of the product in a finely divided form has taken place.

7. A process for producing washing soda in a finely divided form, consisting in making a solution of detergent material containing carbonate of soda in warm water in a sufficient quantity to form with the water present a hydrated carbonate containing not less than 5 molecules of water of crystallization, cooling down the mixture to a temperature above but as close as practicable to that at which the decahydrated carbonate tends to crystallize, and stirring the mixture while subjecting it to the action of an exhaust at a reduced pressure, whereby a finely divided crystallized product is obtained containing the carbonate with from 5 to 7 molecules of water of crystallization.

8. A process for producing washing soda in a finely divided form, consisting in making a mixture of detergent substance containing sodium carbonate with warm water, sufficient to form the heptahydrated carbonate with the carbonate of soda present, and agitating the mixture with stirring and exhausting at a pressure well below atmospheric pressure, whereby vaporization of some of the water is produced and crystallization of the mixture is caused to take place, at a temperature above that at which the decahydrated carbonate tends to crystallize out.

In witness whereof, we have hereunto signed our names this 26th day of February 1912, in the presence of two subscribing witnesses.

WILLIAM REGINALD ORMANDY.
JACOB WILLIAM SPENSLEY.

Witnesses:
  RICH. L. CLEAVER,
  HUBERT A. GILL.